US009977749B2

United States Patent
Kim et al.

(10) Patent No.: US 9,977,749 B2
(45) Date of Patent: May 22, 2018

(54) APPLICATION PROCESSOR AND DATA PROCESSING SYSTEM INCLUDING THE SAME

(71) Applicant: SAMSUNG ELECTRONICS CO., LTD., Suwon-si, Gyeonggi-Do (KR)

(72) Inventors: Sik Kim, Seoul (KR); Kook Won Seo, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 36 days.

(21) Appl. No.: 14/836,457

(22) Filed: Aug. 26, 2015

(65) Prior Publication Data

US 2016/0062921 A1     Mar. 3, 2016

(30) Foreign Application Priority Data

Sep. 1, 2014   (KR) .................. 10-2014-0115672

(51) Int. Cl.
| G06F 12/14 | (2006.01) |
| H04L 9/14 | (2006.01) |
| G06F 11/07 | (2006.01) |
| H04L 9/08 | (2006.01) |
| H04L 9/32 | (2006.01) |

(52) U.S. Cl.
CPC ........ *G06F 12/1408* (2013.01); *G06F 11/073* (2013.01); *G06F 11/0763* (2013.01); *H04L 9/0891* (2013.01); *H04L 9/14* (2013.01); *H04L 9/3242* (2013.01); *G06F 2212/1052* (2013.01)

(58) Field of Classification Search
CPC ............... G06F 12/1408; G06F 11/073; G06F 11/0763; G06F 2212/1052; H04L 9/14; H04L 2209/24
See application file for complete search history.

(56) References Cited

U.S. PATENT DOCUMENTS

| 7,277,542 | B2 | 10/2007 | Duval |
| 7,512,743 | B2 | 3/2009 | Tom et al. |
| 7,657,754 | B2 | 2/2010 | Chambers et al. |
| 8,015,416 | B2 | 9/2011 | Nakashima et al. |
| 8,045,712 | B2 | 10/2011 | Daemen et al. |
| 8,139,763 | B2 | 3/2012 | Boscher et al. |
| 8,464,070 | B2 * | 6/2013 | Kim ..................... H04L 9/3242 713/189 |
| 8,650,399 | B2 | 2/2014 | Le Bihan et al. |
| 8,694,776 | B2 | 4/2014 | Carvounas et al. |

(Continued)

*Primary Examiner* — Kyle Vallecillo
(74) *Attorney, Agent, or Firm* — F. Chau & Associates, LLC

(57) ABSTRACT

A data processing system includes an application processor, a memory device, and a channel connecting the application processor and the memory device. The application processor encrypts first data using a first encryption key and a first initialization vector in response to a write command, and transmits first encrypted data to the memory device through the channel. The memory device decrypts the first encrypted data using a second encryption key and a second initialization vector, and stores first decrypted data in a memory core. The second encryption key and the second initialization vector are stored in the memory device. The first encryption key is the same as the second encryption key, and the first initialization vector is the same as the second initialization vector.

17 Claims, 15 Drawing Sheets

(56) References Cited

U.S. PATENT DOCUMENTS

| | | | |
|---|---|---|---|
| 2002/0112152 A1* | 8/2002 | VanHeyningen | ......... H04L 9/12 |
| | | | 713/151 |
| 2004/0128458 A1 | 7/2004 | Buhr | |
| 2005/0071656 A1 | 3/2005 | Klein et al. | |
| 2006/0045272 A1* | 3/2006 | Ohaka | .................... H04L 9/3271 |
| | | | 380/270 |
| 2006/0153375 A1* | 7/2006 | Yi | ........................ H04L 63/0428 |
| | | | 380/44 |
| 2007/0186117 A1 | 8/2007 | Klein et al. | |
| 2011/0154059 A1 | 6/2011 | Durham et al. | |
| 2011/0154061 A1 | 6/2011 | Chilukuri et al. | |
| 2013/0117577 A1 | 5/2013 | Hars et al. | |
| 2013/0238907 A1 | 9/2013 | Debout et al. | |
| 2013/0262880 A1 | 10/2013 | Pong et al. | |
| 2013/0290736 A1 | 10/2013 | Kudoh et al. | |
| 2013/0318363 A1 | 11/2013 | Wu et al. | |
| 2014/0337528 A1* | 11/2014 | Barton | .................... H04L 63/10 |
| | | | 709/225 |

* cited by examiner

APPLICATION PROCESSOR AND DATA PROCESSING SYSTEM INCLUDING THE SAME

CROSS-REFERENCE TO RELATED APPLICATIONS

This application claims priority under 35 U.S.C. § 119 to Korean Patent Application No. 10-2014-0115672 filed on Sep. 1, 2014, the disclosure of which is incorporated by reference herein in its entirety.

TECHNICAL FIELD

Exemplary embodiments of the inventive concept relate to a data processing system, and more particularly, to a data processing system including a memory device and an application processor for encrypting and decrypting data when transmitting the data through a channel connecting the application processor and the memory device to prevent information from being leaked by an external physical attack.

DISCUSSION OF THE RELATED ART

It is critical to protect information in data processing systems that process and store a lot of information. There are two approaches typically used for protecting important information or security data from an attack on an external memory.

The first approach is using an on-chip memory. In the first approach, important information or security data is stored in on-chip memory (e.g., static random access memory (SRAM) or cache memory) within a processor. However, since an on-chip memory is formed within a processor, space for the on-chip memory is required and the manufacturing cost may increase.

The second approach is encrypting important data or security data using a processor. In the second approach, a processor encrypts and decrypts important data or security data and stores the encrypted/decrypted information or data in external memory. Since data encryption and decryption is performed by a processor, overload may occur in the processor. Since encrypted/decrypted data is stored in external memory, a lot of memory space in the external memory may need to be allocated for the encrypted/decrypted data, which decreases memory space efficiency. Moreover, a processor may encrypt and decrypt data using block encryption. As a result, a delay and excessive power consumption may occur when the processor processes the data.

SUMMARY

Exemplary embodiments of the inventive concept provide a data processing system including a memory device and an application processor for preventing an external attack on data.

According to exemplary embodiments of the inventive concept, when the application processor encrypts write data using an encryption key stored therewithin and transmits encrypted write data to the memory device, the memory device may decrypt the encrypted write data using an encryption key stored therewithin. In addition, when the memory device encrypts read data using the encryption key stored therewithin and transmits encrypted read data to the application processor, the application processor may decrypt the encrypted read data using the encryption key stored therewithin.

According to an exemplary embodiment of the inventive concept, a data processing system includes an application processor, a memory device, and a channel connected between the application processor and the memory device. The application processor may encrypt first data using a first encryption key and a first initialization vector in response to a write command, and transmit first encrypted data to the memory device through the channel. The memory device may decrypt the first encrypted data using a second encryption key and a second initialization vector, and store first decrypted data in a memory core. The second encryption key and the second initialization vector may be stored in the memory device. The first encryption key may be the same as the second encryption key, and the first initialization vector may be the same as the second initialization vector.

The application processor may generate a first message authentication code (MAC) using a third encryption key, a third initialization vector, and the first data, and may transmit both the first MAC and the first encrypted data to the memory device through the channel.

The memory device may generate a second MAC using a fourth encryption key, a fourth initialization vector, and the first decrypted data, may compare the first MAC with the second MAC, may detect an error in the first decrypted data according to a comparison result, and may transmit a detection result to the application processor through the channel.

The application processor may update the first initialization vector stored in a first memory region in the application processor based on the write command, and may transmit a first updated initialization vector to the memory device through the channel. The memory device may update the second initialization vector stored in a second memory region in the memory device using the first updated initialization vector.

The application processor may count the number of issues of the write command and may determine whether to update the first initialization vector according to a count result.

The memory device may encrypt second data stored in the memory core using the second encryption key and the second initialization vector in response to a read command, and may transmit second encrypted data to the application processor through the channel. The application processor may decrypt the second encrypted data using the first encryption key and the first initialization vector to generate second decrypted data.

The memory device may generate a third MAC using a third encryption key, a third initialization vector, and the second data, and may transmit both the third MAC and the second encrypted data to the application processor through the channel.

The application processor may generate a fourth MAC using a fourth encryption key, a fourth initialization vector, and the second decrypted data, may compare the third MAC with the fourth MAC, and may detect an error in the second decrypted data according to a comparison result.

The application processor may update the first initialization vector stored in a first memory region in the application processor based on the read command, and may transmit a first updated initialization vector to the memory device through the channel. The memory device may update the second initialization vector stored in a second memory region in the memory device using the first updated initialization vector.

The application processor may count the number of issues of the read command and may determine whether to update the first initialization vector according to a count result.

According to an exemplary embodiment of the inventive concept, an application processor includes a first memory configured to store a first encryption key, a second memory configured to store a first initialization vector, an encoder configured to encrypt first data using the first encryption key and the first initialization vector and to transmit first encrypted data to a memory device through a channel, and a decoder configured to decrypt second encrypted data received from the memory device using the first encryption key and the first initialization vector to generate second decrypted data.

The application processor may further include a third memory configured to store a second encryption key, a fourth memory configured to store a second initialization vector, a first message authentication code (MAC) generator configured to generate a first MAC using the first data, the second encryption key, and the second initialization vector, to transmit both the first MAC and the first encrypted data to the memory device through the channel, and to generate a second MAC using the second decrypted data, the second encryption key, and the second initialization vector, and an error detector configured to compare the second MAC with the third MAC received from the memory device and to detect an error in the second decrypted data according to a comparison result.

According to an exemplary embodiment of the inventive concept, a method of processing data includes encrypting, by an application processor, first data using a first encryption key and a first initialization vector in response to a write command, transmitting first encrypted data from the application processor to a memory through a channel, wherein the application processor is connected to the memory device via the channel, decrypting, by the memory device, the first encrypted data using a second encryption key and a second initialization vector, and storing first decrypted data in a memory core of the memory device. The second encryption key and the second initialization vector are stored in the memory device, the first encryption key is identical to the second encryption key, and the first initialization vector is identical to the second initialization vector.

The method may further include generating, by the application processor, a first message authentication code (MAC) using a third encryption key, a third initialization vector, and the first data, and transmitting the first MAC and the first encrypted data from the application processor to the memory device through the channel.

The method may further include generating, by the memory device, a second MAC using a fourth encryption key, a fourth initialization vector, and the first decrypted data, comparing, by the memory device, the first MAC with the second MAC, detecting, by the memory device, an error in the first decrypted data according to a comparison result obtained by comparing the first MAC with the second MAC, and transmitting a detection result obtained by detecting the error from the memory device to the application processor through the channel. The fourth encryption key and the fourth initialization vector are stored in the memory device, the third encryption key is identical to the fourth encryption key, and the third initialization vector is identical to the fourth initialization vector.

The method may further include updating, by the application processor, the first initialization vector stored in a first memory region in the application processor based on the write command, transmitting a first updated initialization vector from the application processor to the memory device through the channel, and updating, by the memory device, the second initialization vector stored in a second memory region in the memory device using the first updated initialization vector.

The method may further include counting, by the application processor, a number of issues of the write command, and determining, by the application processor, whether to update the first initialization vector according to a count result obtained by counting the number of issues of the write command.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
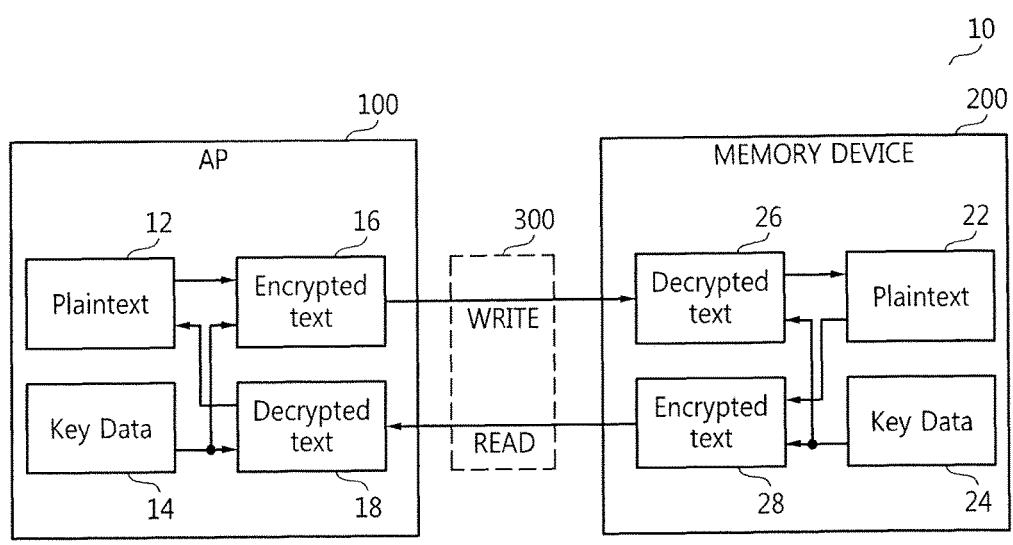
FIG. 1 is a schematic block diagram illustrating an operation of a data processing system according to exemplary embodiments of the inventive concept.

Exemplary embodiments of the inventive concept will be described more fully hereinafter with reference to the accompanying drawings. In the drawings, the size and relative sizes of layers and regions may be exaggerated for clarity. Like reference numerals may refer to like elements throughout the accompanying drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Herein, when two or more elements are described as being substantially the same as each other, it is to be understood that the two elements are identical to each other or similar to each other as would be understood by a person having ordinary skill in the art.

FIG. 1 is a schematic block diagram illustrating operation of a data processing system 10 according to exemplary embodiments of the inventive concept. The data processing system 10 includes an application processor (AP) 100 and a memory device 200.

The data processing system 10 may be implemented as, for example, a personal computer (PC) or a portable electronic device. The portable electronic device may be, for example, a laptop computer, a cellular phone, a smartphone, a tablet PC, a personal digital assistant (PDA), a digital still camera, a digital video camera, a portable multimedia player (PMP), a mobile internet device (MID), a wearable computer, an internet of things (IoT) device, or an internet of everything (IoE) device.

The AP 100 may function as a host controlling the operation of the memory device 200. The AP 100 may be implemented as, for example, an integrated circuit (IC), a system-on-chip (SoC), etc.

The memory device 200 may be formed with volatile or non-volatile memory. The volatile memory may be, for example, dynamic random access memory (DRAM), static random access memory (SRAM), etc. The non-volatile memory may be, for example, electrically erasable programmable read-only memory (EEPROM), flash memory, magnetic RAM (MRAM), spin-transfer torque MRAM, ferroelectric RAM (FeRAM), phase-change RAM (PRAM), resistive RAM (RRAM or ReRAM), etc.

The memory device 200 may be implemented as, for example, a smart card, a secure digital (SD) card, a micro SD card, a multimedia card (MMC), an embedded MMC (eMMC), an embedded multi-chip package (eMCP), a perfect page NAND (PPN), a universal flash storage (UFS), a solid state drive (SSD), an embedded SSD (eSSD), etc.

During a write operation WRITE, the AP 100 may encrypt plaintext data 12 using first key data 14, and transmit encrypted data 16 to the memory device 200 through a channel 300. The memory device 200 may decrypt the encrypted data 16 using second key data 24 to generate decrypted data 26 (e.g., plaintext data 22). The first key data 14 stored in the AP 100 is the same as the second key data 24 stored in the memory device 200.

During a read operation READ, the memory device 200 may encrypt the plaintext data 22 using the second key data 24, and transmit encrypted data 28 to the AP 100 through the channel 300. The AP 100 may decrypt the encrypted data 28 using the first key data 14 to generate decrypted data 18 (e.g., the plaintext data 12).

The AP 100 may encrypt the plaintext data 12 using the first key data 14, and the memory device 200 may encrypt the plaintext data 22 using the second key data 24. Accordingly, encrypted data output from the AP 100 and encrypted data output from the memory device 200 can be protected from an external physical attack (e.g., probing).

Figure 2:
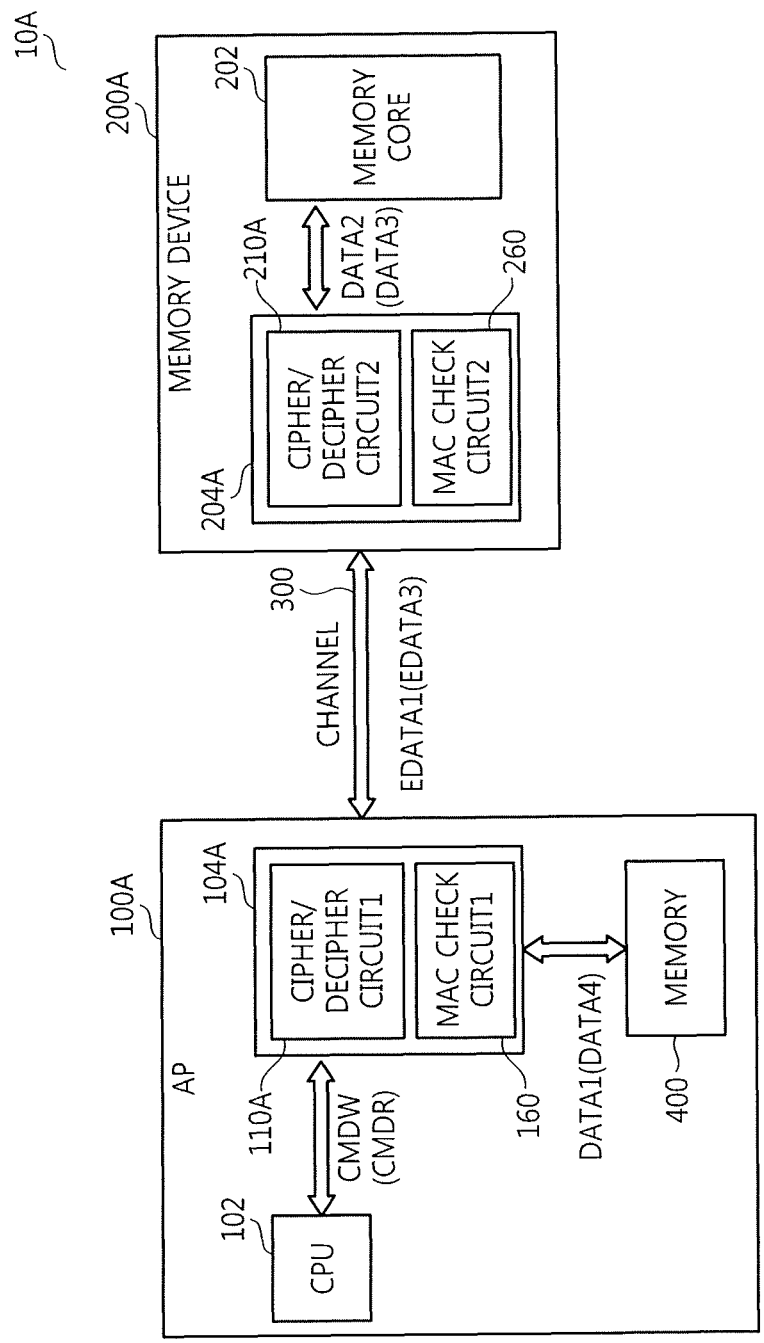
FIG. 2 is a schematic block diagram of a data processing system according to an exemplary embodiment of the inventive concept.

FIG. 2 is a schematic block diagram of a data processing system 10A according to an exemplary embodiment of the inventive concept. Referring to FIG. 2, the data processing system 10A may include an AP 100A, a memory device 200A, and the channel 300 connecting the AP 100A and the memory device 200A. The AP 100A illustrated in FIG. 2 may perform the same or similar functions as the AP 100 illustrated in FIG. 1. The memory device 200A illustrated in FIG. 2 may perform the same or similar functions as the memory device 200 illustrated in FIG. 1.

The AP 100A includes a central processing unit (CPU) 102, a memory controller 104A, and a memory 400. The memory controller 104A includes a first cipher/decipher circuit 110A and a first message authentication code (MAC) check circuit 160.

The AP 100A encrypts first data DATA1 output from the memory 400 in response to a write command CMDW output from the CPU 102, and transmits first encrypted data EDATA1 to the memory device 200A through the channel 300. The memory device 200A decrypts the first encrypted data EDATA1 and stores first decrypted data DATA2 in a memory core 202.

The memory device 200A may read and encrypt second data DATA3 from the memory core 202 in response to a read command CMDR output from the CPU 102 of the AP 100A, and may transmit second encrypted data EDATA3 to the AP 100A through the channel 300. The AP 100A may decrypt the second encrypted data EDATA3 to generate second decrypted data DATA4, and may store the second decrypted data DATA4 in the memory 400. The second decrypted data DATA4 may be transmitted to the CPU 102. For example, the AP 100A transmits the first encrypted data EDATA1 to the memory device 200A through the channel 300 or receives the second encrypted data EDATA3 from the memory device 200A through the channel 300.

The CPU 102 may control overall data processing operations such as, for example, encryption and decryption, performed in the AP 100A. The CPU 102 may include at least one CPU core. When the write command CMDW issued by the CPU 102 is sent to the memory device 200A, the memory device 200A performs a write operation in response to the write command CMDW. When the read command CMDR issued by the CPU 102 is sent to the memory device 200A, the memory device 200A performs a read operation in response to the read command CMDR.

The memory controller 104A may control data transmission between the AP 100A and the memory device 200A. For a write operation, the memory controller 104A may read the first data DATA1 from the memory 400 in response to the write command CMDW from the CPU 102, encrypt the first data DATA1, and transmit the first encrypted data EDATA1 to the memory device 200A through the channel 300. For a read operation, the memory controller 104A may read the second encrypted data EDATA3 from the memory device 200A in response to the read command CMDR from the CPU 102, decrypt the second encrypted data EDATA3, and store the second decrypted data DATA4 in the memory 400.

The first cipher/decipher circuit 110A may encrypt or decrypt data. For example, the first cipher/decipher circuit 110A encrypts the first data DATA1 and transmits the first encrypted data EDATA1 to the memory device 200A through the channel 300, or decrypts the second encrypted data EDATA3 received from the memory device 200A through the channel 300 and transmits the second decrypted data DATA4 to the memory 400.

The first MAC check circuit 160 generates a MAC for data to be processed and checks the data for errors using the MAC. For example, the first MAC check circuit 160 may check whether data has been under an external physical attack based on errors found during the checking process.

The memory device 200A includes the memory core 202 and an interface 204A. The interface 204A may include a second cipher/decipher circuit 210A and a second MAC check circuit 260. The memory device 200A may be formed with volatile or non-volatile memory. The memory core 202 stores the data DATA2 or DATA3.

The interface 204A may control data transmission between the memory controller 104A and the memory core 202. The interface 204A may control access operations such as, for example, a write operation and a read operation, on the memory core 202.

The interface 204A may decrypt the first encrypted data EDATA1 to generate the first decrypted data DATA2, and may store the first decrypted data DATA2 in the memory core 202. In addition, the interface 204A may encrypt second data DATA3 received from the memory core 202 to generate the second encrypted data EDATA3, and may transmit the second encrypted data EDATA3 to the AP 100A through the channel 300.

The second cipher/decipher circuit 210A may encrypt or decrypt data. For example, the second cipher/decipher circuit 210A encrypts the second data DATA3 and transmits the second encrypted data EDATA3 to the AP 100A through the channel 300, or decrypts the first encrypted data EDATA1 and transmits the first decrypted data DATA2 to the memory core 202.

The second MAC check circuit 260 generates a MAC for data to be processed and checks the data for errors using the MAC. For example, the second MAC check circuit 260 may check whether data has been under an external physical attack based on errors found during the checking process.

The AP 100A and the memory device 200A may perform two-way communication through the channel 300. The channel 300 may support, for example, peripheral component interconnect-express (PCI-E), advanced technology attachment (ATA), serial ATA (SATA), parallel ATA (PATA), or serial attached SCSI (SAS). The memory 400 may function as an operation memory of the AP 100A. The memory 400 may be formed, for example, with a register(s) or SRAM.

Figure 3:
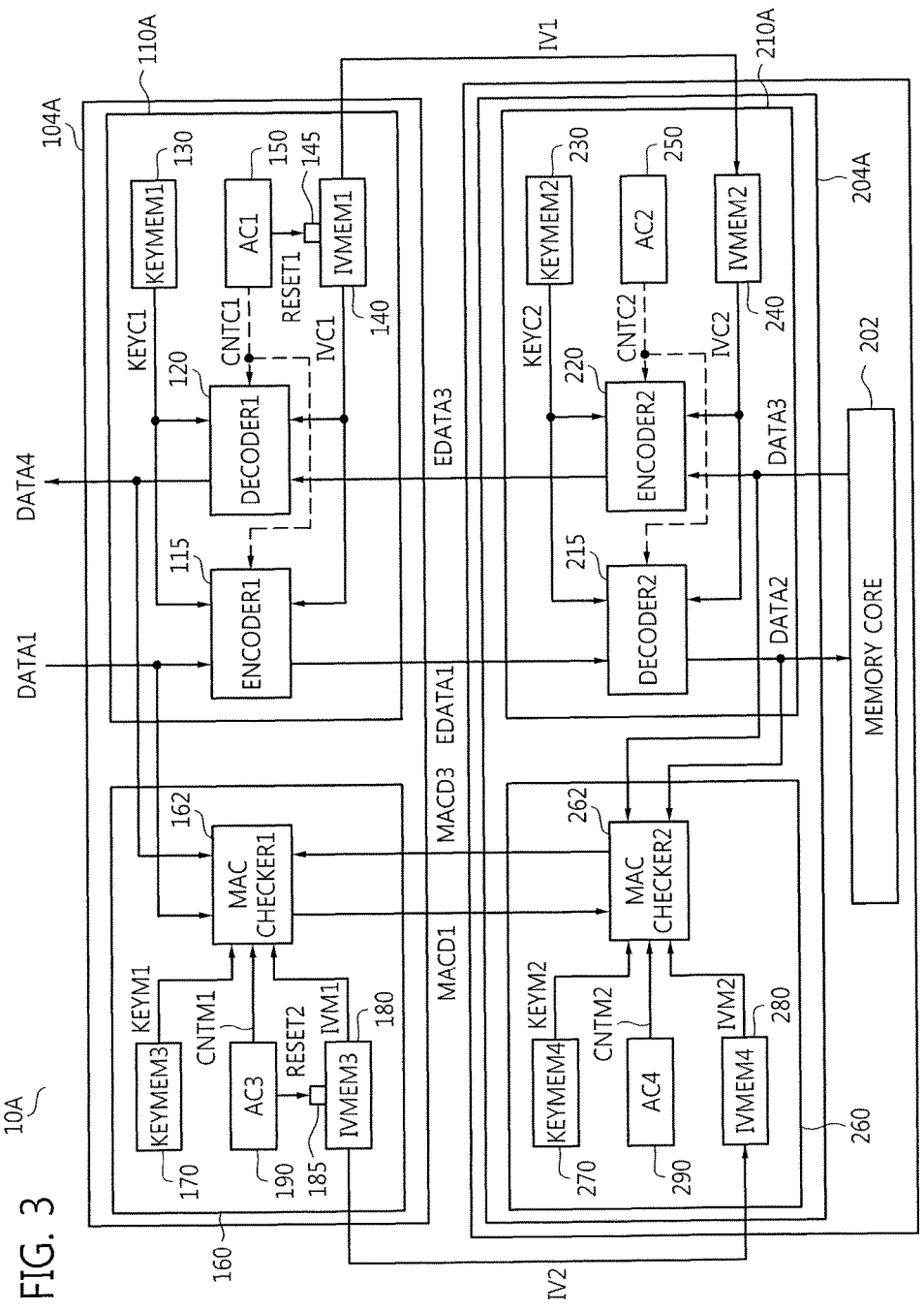
FIG. 3 is a detailed block diagram of the data processing system illustrated in FIG. 2 according to an exemplary embodiment of the inventive concept.

FIG. 3 is a detailed block diagram of the data processing system 10A illustrated in FIG. 2 according to an exemplary embodiment of the inventive concept. Referring to FIG. 3, the first cipher/decipher circuit 110A may include a first encoder 115, a first decoder 120, a first key memory 130, a first initialization vector memory 140, a first random number generator 145, and a first access counter 150.

The first key memory 130 may store a first encryption key KEYC1. The first initialization vector memory 140 may store first initialization vector IVC1. The first access counter 150 may generate a first count value CNTC1.

Figure 4:
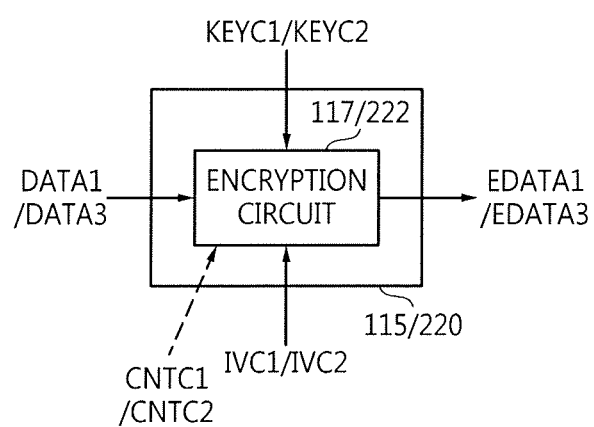
FIG. 4 is a block diagram of a first encoder and a second encoder illustrated in FIG. 3 according to an exemplary embodiment of the inventive concept.

FIG. 4 is a block diagram of the first encoder 115 and a second encoder 220 illustrated in FIG. 3 according to an exemplary embodiment of the inventive concept. Referring to FIGS. 3 and 4, apart from input and output signals of the first encoder 115 and input and output signals of the second encoder 220, the structure and operations of the first encoder 115 are substantially the same as those of the second encoder 220.

The first encoder 115 may encrypt the first data DATA1 using the first encryption key KEYC1 and the first initialization vector IVC1 to generate the first encrypted data EDATA1. Alternatively, the first encoder 115 may encrypt the first data DATA1 using the first encryption key KEYC1, the first initialization vector IVC1, and the first count value CNTC1 to generate the first encrypted data EDATA1.

The second encoder 220 may encrypt the second data DATA3 using a second encryption key KEYC2 and a second initialization vector IVC2 to generate the second encrypted data EDATA3. Alternatively, the second encoder 220 may encrypt the second data DATA3 using the second encryption key KEYC2, the second initialization vector IVC2, and a second count value CNTC2 to generate the second encrypted data EDATA3.

The encoders 115 and 220 may include encryption circuits 117 and 222, respectively, which perform encryption. The encoders 115 and 220 may encrypt the data DATA1 and DATA3, respectively, using a stream cipher. A stream cipher algorithm may be implemented as, for example, Trivium, Sals20, Rabbit, SOSEMANUK, or HC-128.

Figure 5:
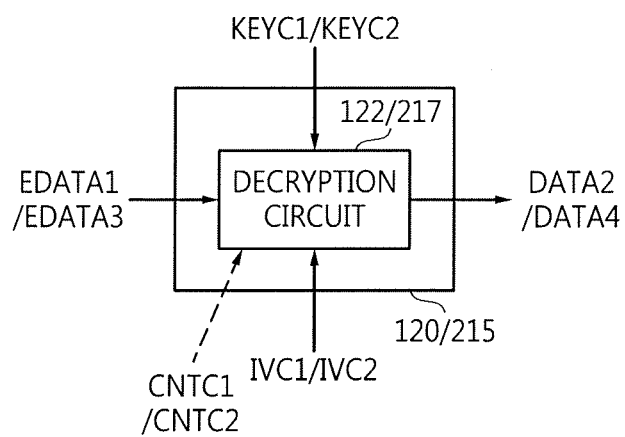
FIG. 5 is a block diagram of a first decoder and a second decoder illustrated in FIG. 3 according to an exemplary embodiment of the inventive concept.

FIG. 5 is a block diagram of the first decoder 120 and a second decoder 215 illustrated in FIG. 3 according to an exemplary embodiment of the inventive concept. Referring to FIGS. 3 and 5, apart from input and output signals of the first decoder 120 and input and output signals of the second decoder 215, the structure and operations of the first decoder 120 are substantially the same as those of the second decoder 215.

The first decoder 120 may decrypt the second encrypted data EDATA3 using the first encryption key KEYC1 and the first initialization vector IVC1 to generate the second decrypted data DATA4. Alternatively, the first decoder 120 may decrypt the second encrypted data EDATA3 using the first encryption key KEYC1, the first initialization vector IVC1, and the first count value CNTC1 to generate the second decrypted data DATA4.

The second decoder 215 may decrypt the first encrypted data EDATA1 using the second encryption key KEYC2 and the second initialization vector IVC2 to generate the first decrypted data DATA2. Alternatively, the second decoder 215 may decrypt the first encrypted data EDATA1 using the second encryption key KEYC2, the second initialization vector IVC2, and the second count value CNTC2 to generate the first decrypted data DATA2. The decoders 120 and 215 may include decryption circuits 122 and 217, respectively, which perform decryption.

The first key memory 130 may be a non-volatile memory and may store the first encryption key KEYC1. The first encryption key KEYC1 may be created during the manufacture of the AP 100A. For example, the first encryption key KEYC1 may be one-time programmable (OTP) key data that is programmed during the manufacture of the AP 100A. Alternatively, the first encryption key KEYC1 may be programmed by the AP 100A after the AP 100A is manufactured.

The first encryption key KEYC1 may be a random number. The first encryption key KEYC1 may be a stream cipher key. The AP 100A may transmit the first encryption key KEYC1 that has been programmed to the memory device 200A. The memory device 200A may store the first encryption key KEYC1 in a second key memory 230 as the second encryption key KEYC2. Accordingly, in exemplary embodiments, the first encryption key KEYC1 is the same as the second encryption key KEYC2. That is, in exemplary embodiments, the first encryption key KEYC1 and the second encryption key KEYC2 are identical to each other (e.g., a value of the first encryption key KEYC1 and a value of the second encryption key KEYC2 are equal to each other).

The first access counter 150 may count the number of accesses (e.g., write or read operations) of the AP 100A to the memory device 200A to generate the first count value CNTC1. The first access counter 150 counts the number of issues (e.g., write transactions) of the write command CMDW and counts the number of issues (e.g., read transactions) of the read command CMDR.

Figure 6:
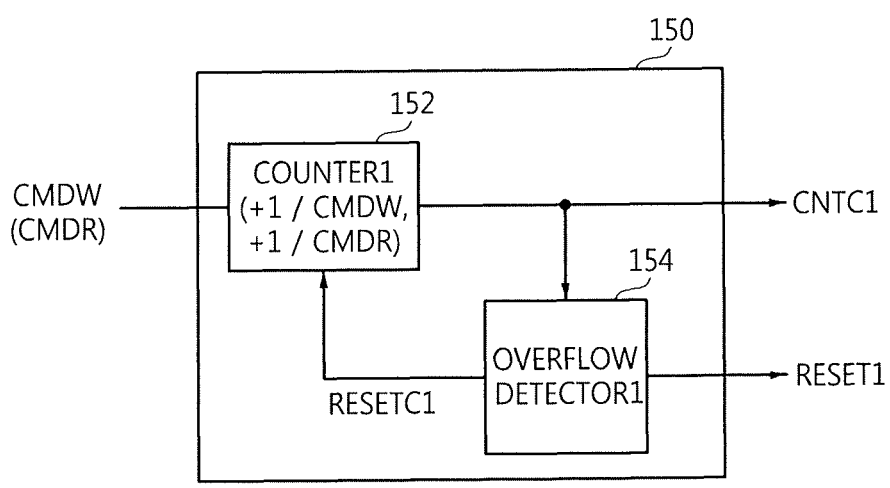
FIG. 6 is a block diagram of a first access counter illustrated in FIG. 3 according to an exemplary embodiment of the inventive concept.

FIG. 6 is a block diagram of the first access counter 150 illustrated in FIG. 3. Referring to FIGS. 3 and 6, the first access counter 150 may include a first counter 152 and a first overflow detector 154.

The first counter 152 counts each time it receives either the write command CMDW or the read command CMDR and generates the first count value CNTC1 based on a summation of the number of times the write command CMDW and the read command CMDR have been received. For example, when the write command CMDW is received five times and the read command CMDR is received three times, the first count value CNTC1 is 8.

When the first count value CNTC1 reaches a reference count value, the first overflow detector 154 transmits a first counter reset signal RESETC1 to the first counter 152, which resets the first count value CNTC1. In addition, the first overflow detector 154 transmits a first reset signal RESET1 to the first random number generator 145 when the first count value CNTC1 reaches the reference count value. The first random number generator 145 is reset in response to the first reset signal RESET1 and then generates a new random number (e.g., UPDATE in FIG. 7).

The first initialization vector memory 140 stores the first initialization vector IVC1. The first initialization vector IVC1 is used to indicate the start of the first encrypted data EDATA1. The first initialization vector IVC1 is a random number generated by the first random number generator 145. When the AP 100A transmits the first initialization vector IVC1 to the memory device 200A, the memory device 200A stores the first initialization vector IVC1 in a second initialization vector memory 240 as the second initialization vector IVC2.

Figure 7:
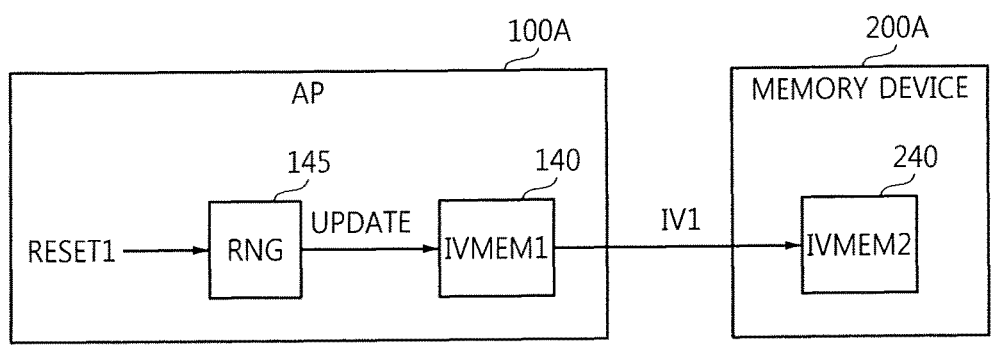
FIG. 7 is a conceptual diagram illustrating a method of updating a first initialization vector and a second initialization vector illustrated in FIG. 3 according to an exemplary embodiment of the inventive concept.

FIG. 7 is a conceptual diagram illustrating a method of updating the first initialization vector IVC1 and the second initialization vector IVC2 illustrated in FIG. 3 according to an exemplary embodiment of the inventive concept. Referring to FIGS. 3 and 7, the first initialization vector memory 140 stores the new random number UPDATE output from the first random number generator 145 as a first updated initialization vector IV1. The AP 100A transmits the first updated initialization vector IV1 to the memory device 200A. The memory device 200A stores the first updated initialization vector IV1 in the second initialization vector memory 240 as a second updated initialization vector IV1. As a result, the second initialization vector IVC2 is updated with the second updated initialization vector IV1.

Figure 8:
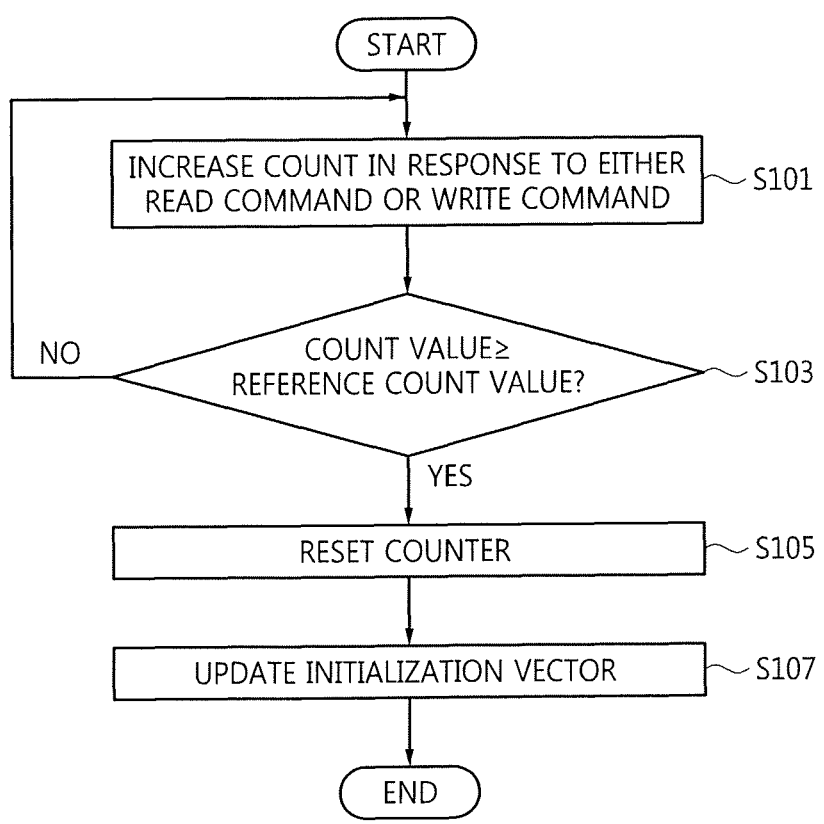
FIG. 8 is a flowchart of a method of operating the first access counter illustrated in FIG. 6 according to an exemplary embodiment of the inventive concept.

FIG. 8 is a flowchart of a method of operating the first access counter 150 illustrated in FIG. 6 according to an exemplary embodiment of the inventive concept. Referring to FIGS. 6 through 8, the first counter 152 increases the first count value CNTC1 by one each time it receives either the read command CMDR or the write command CMDW in operation S101.

The first overflow detector 154 determines whether the first count value CNTC1 has reached a reference count value in operation S103. When the first count value CNTC1 has reached the reference count value, the first overflow detector 154 outputs the first counter reset signal RESETC1 to the first counter 152 and outputs the first reset signal RESET1 to the first random number generator 145. As a result, the first counter 152 is reset in operation S105 and the first random number generator 145 generates the new random number UPDATE. The first initialization vector IVC1 stored in the first initialization vector memory 140 is updated with the new random number UPDATE (=IV1) in operation S107. As described above, the second initialization vector IVC2 stored in the second initialization vector memory 240 is also updated with the new random number UPDATE (=IV1) in operation S107. The first counter 152 repeats operation S101 until the first count value CNTC1 reaches the reference count value.

Referring back to FIG. 3, the second cipher/decipher circuit 210A may include the second decoder 215, the second encoder 220, the second key memory 230, the second initialization vector memory 240, and a second counter 250.

The second initialization vector memory 240 stores the second initialization vector IVC2, which is the same as the first initialization vector IVC1. That is, in exemplary embodiments, the second initialization vector IVC2 and the first initialization vector IVC1 are identical to each other (e.g., a value of the second initialization vector IVC2 and a value of the first initialization vector IVC1 are equal to each other). Apart from the structure and operations of a second overflow detector corresponding to the first overflow detector 154, the structure and operations of the first access counter 150 are substantially the same as those of the second access counter 250. The second overflow detector does not generate a second reset signal corresponding to the first reset signal RESET1.

The first MAC check circuit 160 may include a first MAC checker 162, a third key memory 170, a third access counter 190, a third initialization vector memory 180, and a second random number generator 185.

The first MAC checker 162 generates a first MAC MACD1 for the first data DATA1 using a third encryption key KEYM1, a third initialization vector IVM1, and/or a third count value CNTM1, and transmits the first MAC MACD1 to the interface 204A. In addition, the first MAC checker 162 generates a MAC for the second decrypted data DATA4 using the third encryption key KEYM1, the third initialization vector IVM1, and/or the third count value CNTM1, compares the MAC with a third MAC MACD3 received from a second MAC checker 262, and checks the second decrypted data DATA4 for errors based on the comparison result.

The third key memory 170 stores the third encryption key KEYM1. The third initialization vector memory 180 stores the third initialization vector IVM1. The third access counter 190 generates the third count value CNTM1. The structure and operations of the third access counter 190 are substantially the same as those of the first access counter 150 illustrated in FIG. 6. The structure and operations of the second random number generator 185 are substantially the same as those of the first random number generator 145 illustrated in FIG. 7. A second reset signal RESET2 is used to reset the second random number generator 185 in a similar manner as the first reset signal RESET1 is used to reset the first random number generator 145 as described above.

Referring to FIGS. 3 and 7, the third initialization vector memory 180 stores a new random number output from the second random number generator 185 as a third updated initialization vector IV2. The AP 100A transmits the third updated initialization vector IV2 to the memory device 200A. The memory device 200A stores the third updated initialization vector IV2 in a fourth initialization vector memory 280 as a fourth updated initialization vector IV2. As a result, a fourth initialization vector IVM2 is updated with the fourth updated initialization vector IV2.

Figure 9:
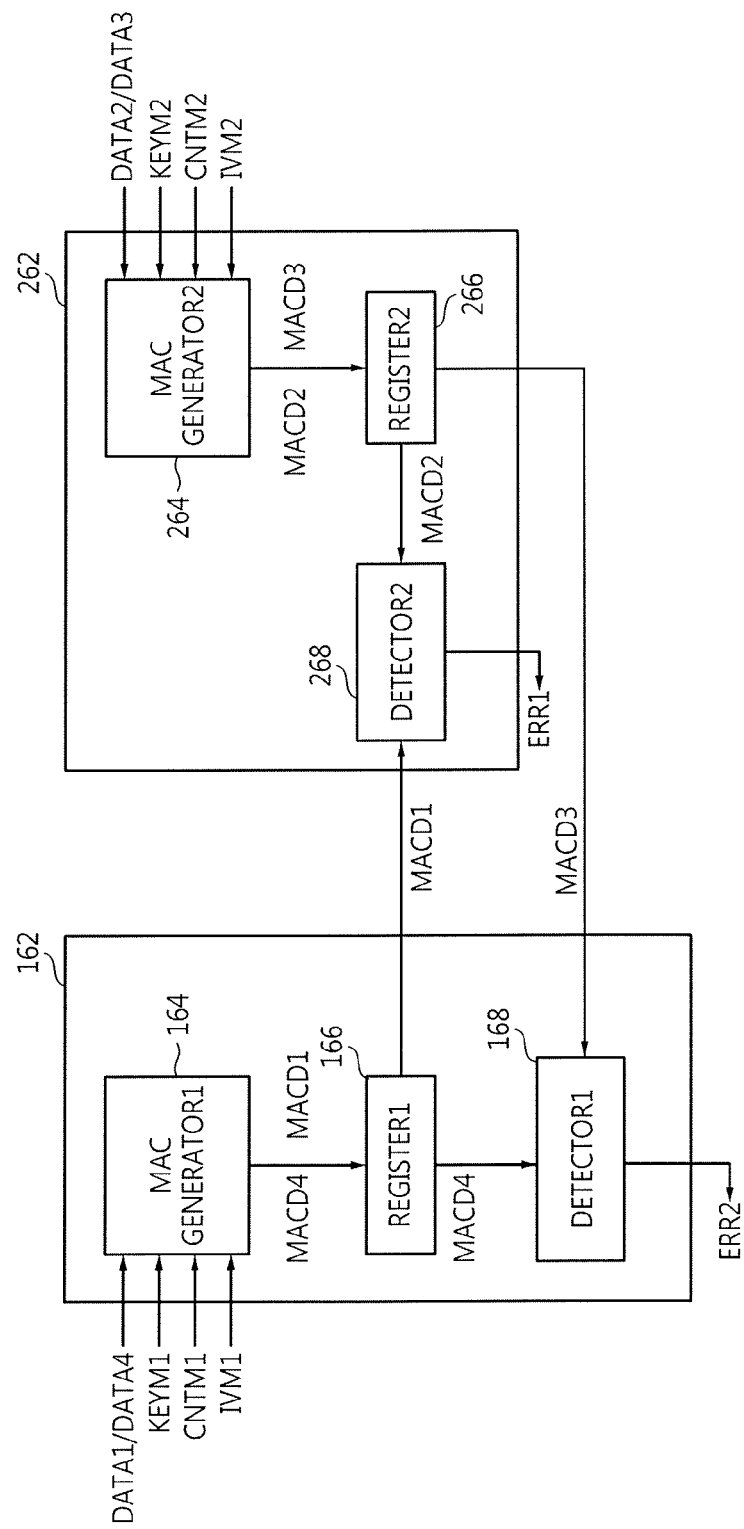
FIG. 9 is a schematic block diagram of a first message authentication code (MAC) checker and a second MAC checker illustrated in FIG. 3 according to an exemplary embodiment of the inventive concept.

FIG. 9 is a schematic block diagram of the first MAC checker 162 and the second MAC checker 262 illustrated in FIG. 3. Referring to FIG. 9, the first MAC checker 162 may include a first MAC generator 164, a first register 166, and a first detector 168.

The first MAC generator 164 generates the first MAC MACD1 for the first data DATA1 using the third encryption key KEYM1, the third count value CNTM1, and/or the third initialization vector IVM1. The first MAC generator 164 also generates a fourth MAC MACD4 for the second decrypted data DATA4 using the third encryption key KEYM1, the third count value CNTM1, and/or the third initialization vector IVM1. The first register 166 stores the first MAC MACD1 and/or the fourth MAC MACD4.

The first detector 168 compares the third MAC MACD3 with the fourth MAC MACD4 and generates a second error signal ERR2 when the third MAC MACD3 is not the same as the fourth MAC MACD4. The second error signal ERR2 is sent to the CPU 102.

The second MAC checker 262 may include a second MAC generator 264, a second register 266, and a second detector 268. The second MAC generator 264 generates a second MAC MACD2 for the first decrypted data DATA2 using a fourth encryption key KEYM2, a fourth count value CNTM2, and/or the fourth initialization vector IVM2. The second MAC generator 264 also generates the third MAC MACD3 for the second data DATA3 using the fourth encryption key KEYM2, the fourth count value CNTM2, and/or the fourth initialization vector IVM2. The second register 266 stores the second MAC MACD2 and/or the third MAC MACD3.

The second detector 268 compares the first MAC MACD1 with the second MAC MACD2 and generates a first error signal ERR1 when the first MAC MACD1 is not the same as the second MAC MACD2. The first error signal ERR1 is sent to the CPU 102 through the channel 300. The MACs MACD1 through MACD4 may be generated using, for example, a hash function.

The second MAC check circuit 260 includes the second MAC checker 262, a fourth key memory 270, the fourth initialization vector memory 280, and a fourth access counter 290. The fourth key memory 270 stores the fourth encryption key KEYM2. In exemplary embodiments, the fourth encryption key KEYM2 is the same as the third encryption key KEYM1. That is, in exemplary embodiments, the fourth encryption key KEYM2 and the third encryption key KEYM1 are identical to each other (e.g., a value of the fourth encryption key KEYM2 and a value of the third encryption key KEYM1 are equal to each other). The fourth initialization vector memory 280 stores the fourth initialization vector IVM2. In exemplary embodiments, the fourth initialization vector IVM2 is the same as the third initialization vector IVM1. That is, in exemplary embodiments, the fourth initialization vector IVM2 and the third initialization vector IVM1 are identical to each other (e.g., a value of the fourth initialization vector IVM2 and a value of the third initialization vector IVM1 are equal to each other). The fourth access counter 290 outputs the fourth count value CNTM2. The structure and operations of the fourth access counter 290 are substantially the same as those of the second access counter 250. The memory core 202 may store the first decrypted data DATA2 and the second data DATA3.

Figure 10:
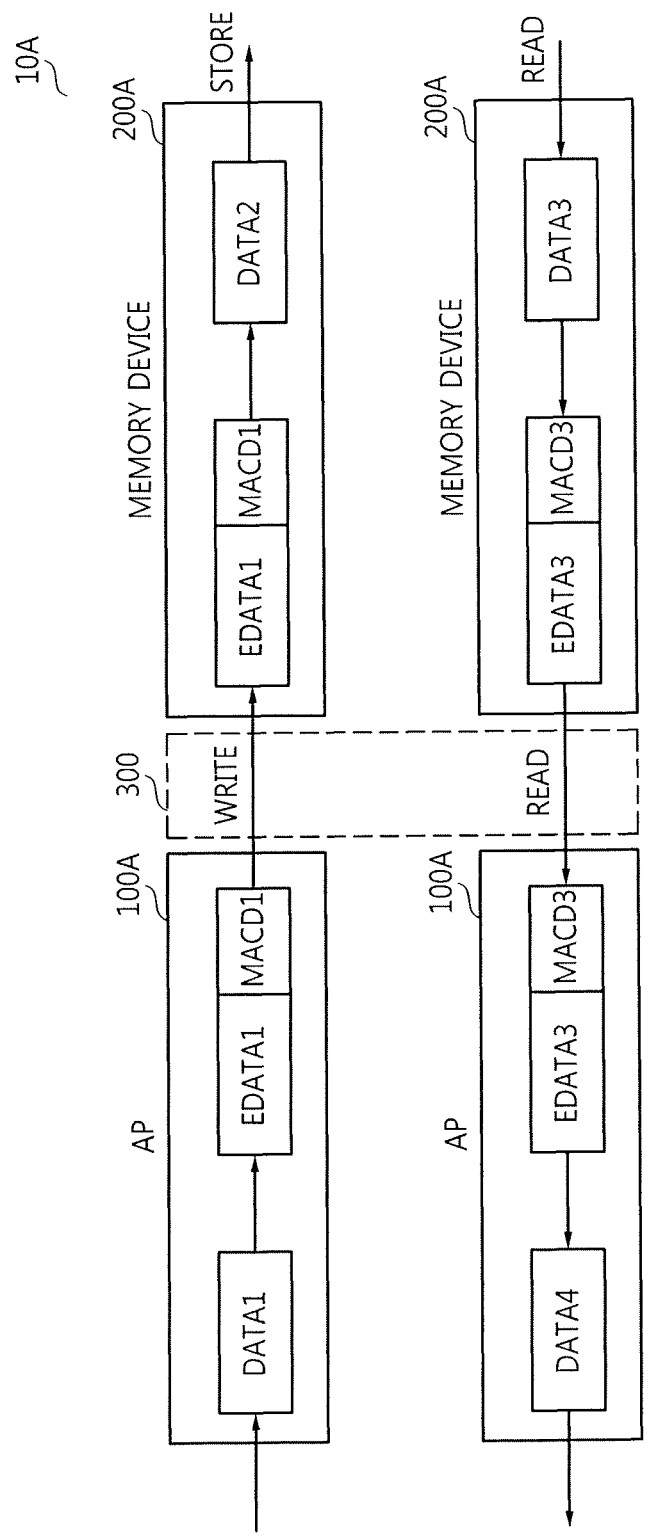
FIG. 10 is a conceptual diagram of the operation of the data processing system illustrated in FIG. 3 according to an exemplary embodiment of the inventive concept.

FIG. 10 is a conceptual diagram of the operation of the data processing system 10A illustrated in FIG. 3 according to an exemplary embodiment of the inventive concept. Referring to FIGS. 3 and 10, during the write operation WRITE, the AP 100A encrypts the first data DATA1 using the first encryption key KEYC1 and the first initialization vector IVC1 to generate the first encrypted data EDATA1, and generates the first MAC MACD1 simultaneously/in parallel. The AP 100A transmits the first encrypted data EDATA1 and the first MAC MACD1 to the memory device 200A. The first encrypted data EDATA1 and the first MAC MACD1 may be transmitted in series or in parallel. The mode for transmitting the first encrypted data EDATA1 and the first MAC MACD1 may be determined depending on the structure of the channel 300.

The memory device 200A may receive the first encrypted data EDATA1 and the first MAC MACD1, may decrypt the first encrypted data EDATA1 using the second encryption key KEYC2 and the second initialization vector IVC2, and may store the first decrypted data DATA2 in the memory core 202. At this time, as described above with reference to FIG. 9, the first MAC MACD1 may be used to check the first decrypted data DATA2 for errors.

During the read operation READ, the memory device 200A encrypts the second data DATA3 using the second encryption key KEYC2 and the second initialization vector IVC2 to generate the second encrypted data EDATA3, and generates the third MAC MACD3 simultaneously/in parallel. The memory device 200A transmits the second encrypted data EDATA3 and the third MAC MACD3 to the AP 100A through the channel 300. The second encrypted data EDATA3 and the third MAC MACD3 may be transmitted in series or in parallel.

The AP 100A may receive the second encrypted data EDATA3 and the third MAC MACD3, and may decrypt the second encrypted data EDATA3 using the first encryption key KEYC1 and the first initialization vector IVC1 to generate the second decrypted data DATA4. At this time, as described above with reference to FIG. 9, the third MAC MACD3 may be used to check the second decrypted data DATA4 for errors.

Figure 11:
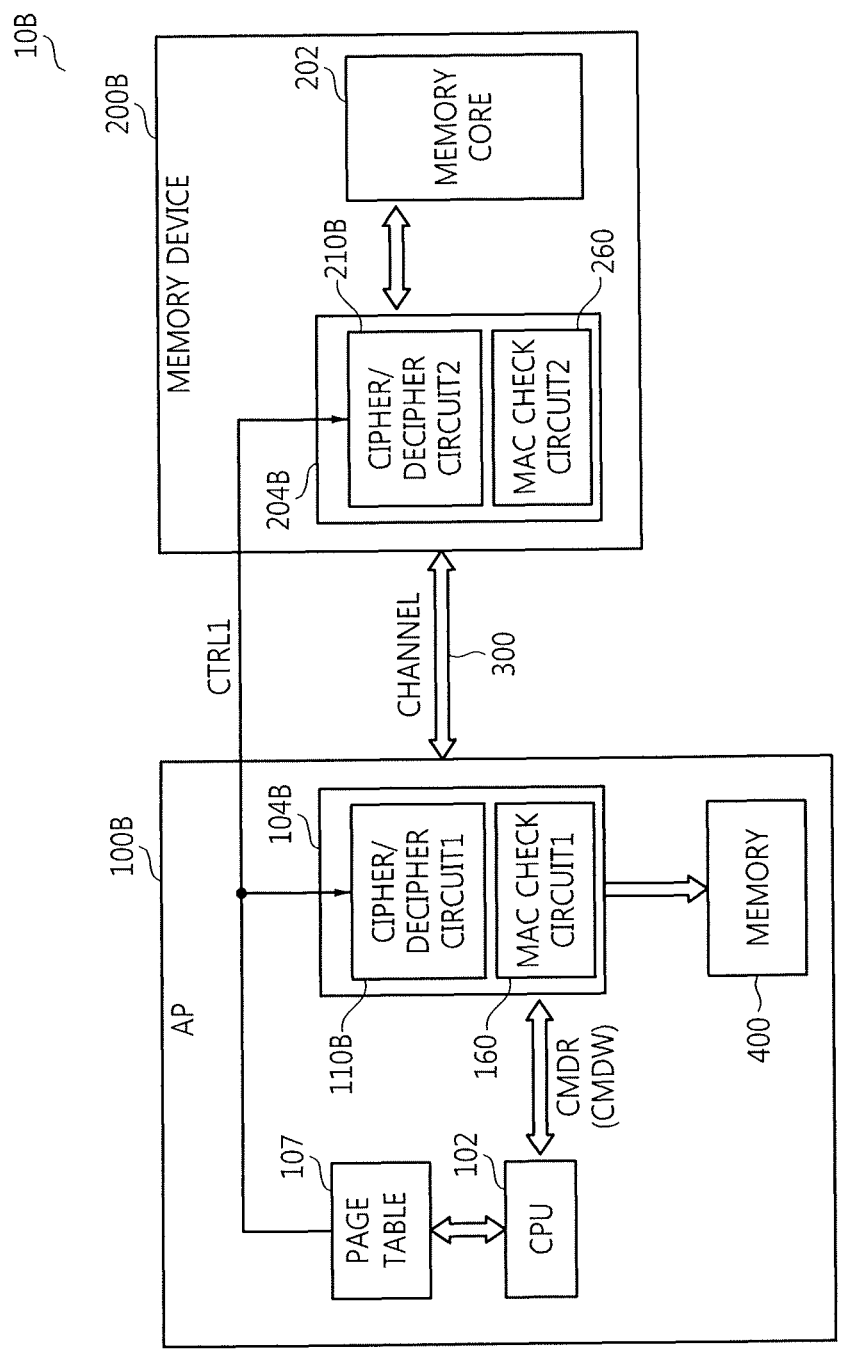
FIG. 11 is a schematic block diagram of a data processing system according to an exemplary embodiment of the inventive concept.

FIG. 11 is a schematic block diagram of a data processing system 10B according to an exemplary embodiment of the inventive concept. Referring to FIG. 11, the data processing system 10B may include an AP 100B, a memory device 200B, and the channel 300 connecting the AP 100B and the memory device 200B. The data processing system 10B may perform encryption and decryption of data using a page table 107 included in the AP 100B.

The page table 107 may include information regarding physical addresses corresponding to logical addresses. The page table 107 may be stored in a memory that can be accessed by the CPU 102. The CPU 102 may retrieve information from the page table 107 in response to the read command CMDR or the write command CMDW. For example, the CPU 102 may retrieve a physical address corresponding to a logical address from the page table 107.

The structure and operations of the memory 400 illustrated in FIG. 11 are substantially the same as those of the memory 400 illustrated in FIG. 2. The structure and operations of the memory controller 104B illustrated in FIG. 11 are substantially the same as those of the memory controller 104A illustrated in FIG. 2. The structure and operations of the interface 204B illustrated in FIG. 11 are substantially the same as those of the interface 204A illustrated in FIG. 2.

Figure 12:
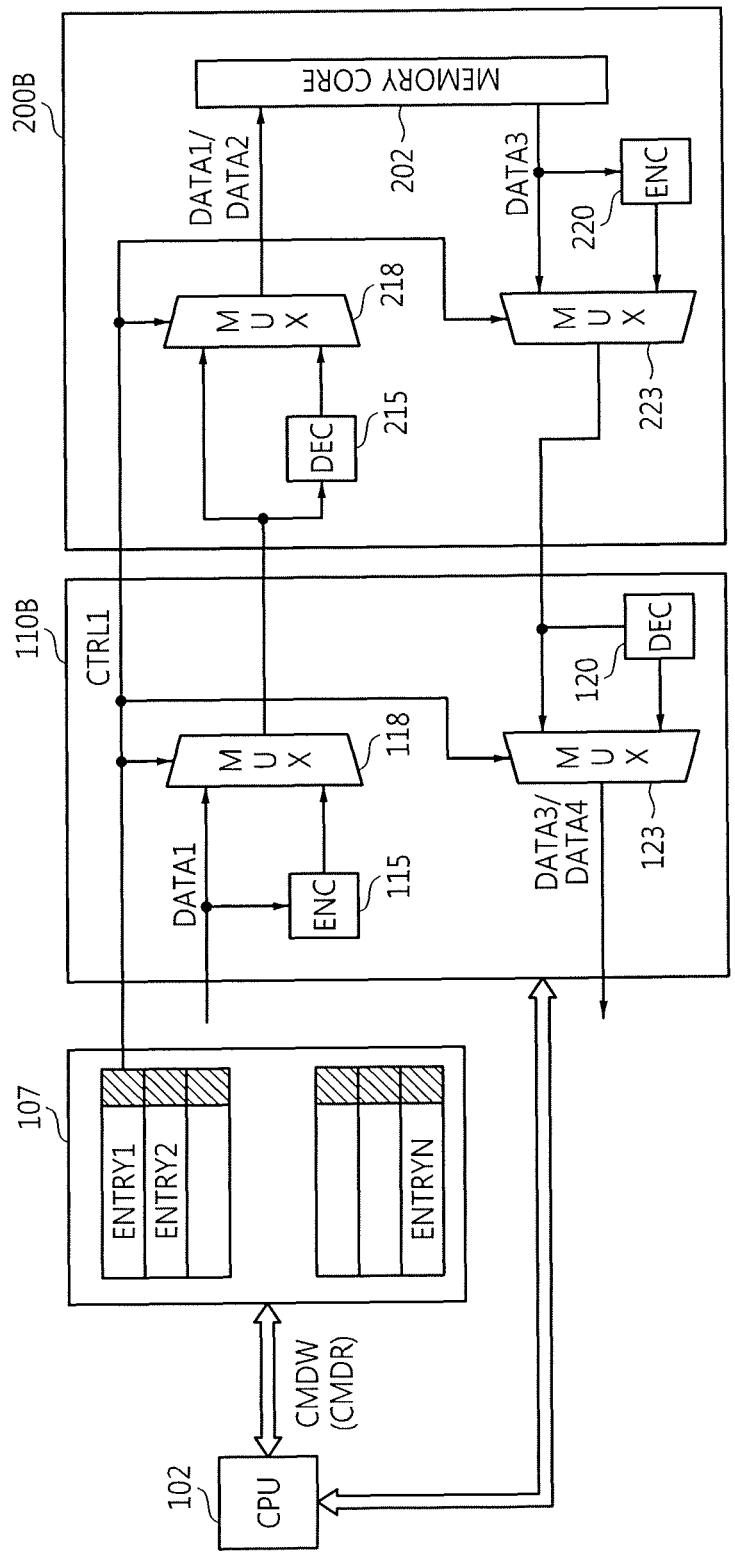
FIG. 12 is a schematic block diagram illustrating a method of operating the data processing system illustrated in FIG. 11 using information included in a page table according to an exemplary embodiment of the inventive concept.

FIG. 12 is a schematic block diagram illustrating a method of operating the data processing system 10B illustrated in FIG. 11 using information included in the page table 107 according to an exemplary embodiment of the inventive concept. Referring to FIGS. 11 and 12, the first encoder 115 encrypts the first data DATA1 and outputs first encrypted data. A first selection circuit 118 (e.g., a multiplexer) outputs either the first data DATA1 or the first encrypted data to the memory device 200B in response to a selection signal CTRL1. The first decoder 120 decrypts data (e.g., the second data DATA3 or the second encrypted data EDATA3) received from the memory device 200B and outputs decrypted data. A second selection circuit 123 (e.g., a multiplexer) outputs either the data from the memory device 200B or the decrypted data from the first decoder 120 in response to the selection signal CTRL1.

The second decoder 215 decrypts data output from the first selection circuit 118 and outputs decrypted data. A third selection circuit 218 (e.g., a multiplexer) outputs, as the first decrypted data DATA2, either the data from the first selection circuit 118 or the decrypted data from the second decoder 215 to the memory core 202 in response to the selection signal CTRL1.

The second encoder 220 encrypts the second data DATA3 from the memory core 202 and outputs encrypted data. A fourth selection circuit 223 (e.g., a multiplexer) outputs either the second data DATA3 or the encrypted data from the second encoder 220 to the AP 100B in response to the selection signal CTRL1. According to exemplary embodiments, each of the selection circuits 118, 123, 218, and 223 may be implemented as a multiplexer and the selection signal CTRL1 may include at least one bit.

The page table 107 may include a plurality of page entries ENTRY1 through ENTRYN, where N is a natural number. Each of the page entries ENTRY1 through ENTRYN may include information (e.g., data) corresponding to a selection signal.

Figure 13:
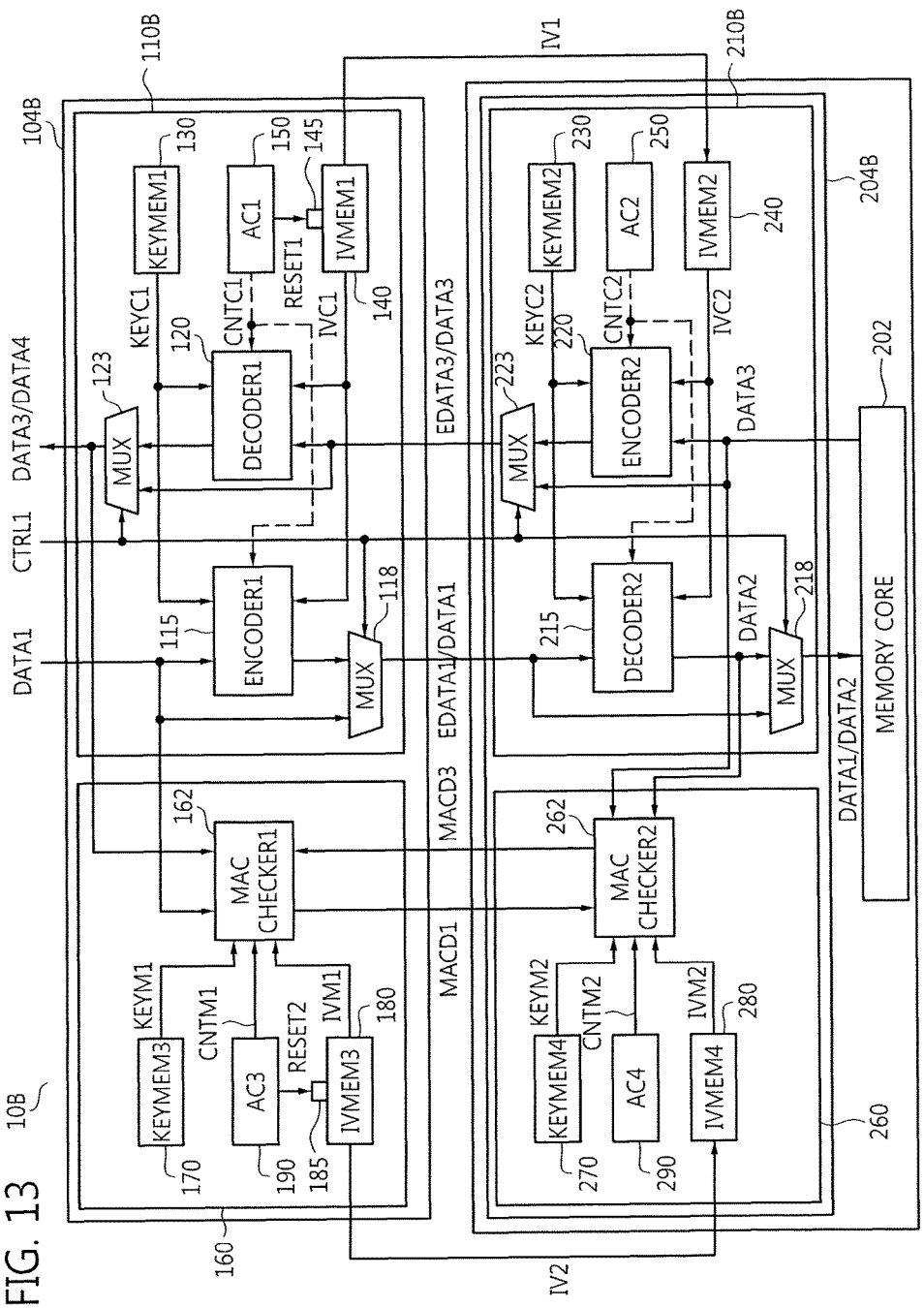
FIG. 13 is a detailed block diagram of the data processing system illustrated in FIG. 11 according to an exemplary embodiment of the inventive concept.

FIG. 13 is a detailed block diagram of the data processing system 10B illustrated in FIG. 11 according to an exemplary embodiment of the inventive concept. Apart from the selection circuits 118 and 123, the structure and operations of the first cipher/decipher circuit 110B illustrated in FIG. 13 are substantially the same as those of the first cipher/decipher circuit 110A illustrated in FIG. 3. Similarly, apart from the selection circuits 218 and 223, the structure and operations of the second cipher/decipher circuit 210B illustrated in FIG. 13 are substantially the same as those of the second cipher/decipher circuit 210A illustrated in FIG. 3. For convenience of explanation, a further description of elements previously described with reference to FIG. 3 is omitted herein.

Referring to FIGS. 12 and 13, during a write operation, the memory device 200B may write the first data DATA1 or the first decrypted data DATA2 to the memory core 202 in response to the selection signal CTRL1. During a read operation, the AP 100B may read the second data DATA3 or generate the second decrypted data DATA4 in response to the selection signal CTRL1.

Figure 14:
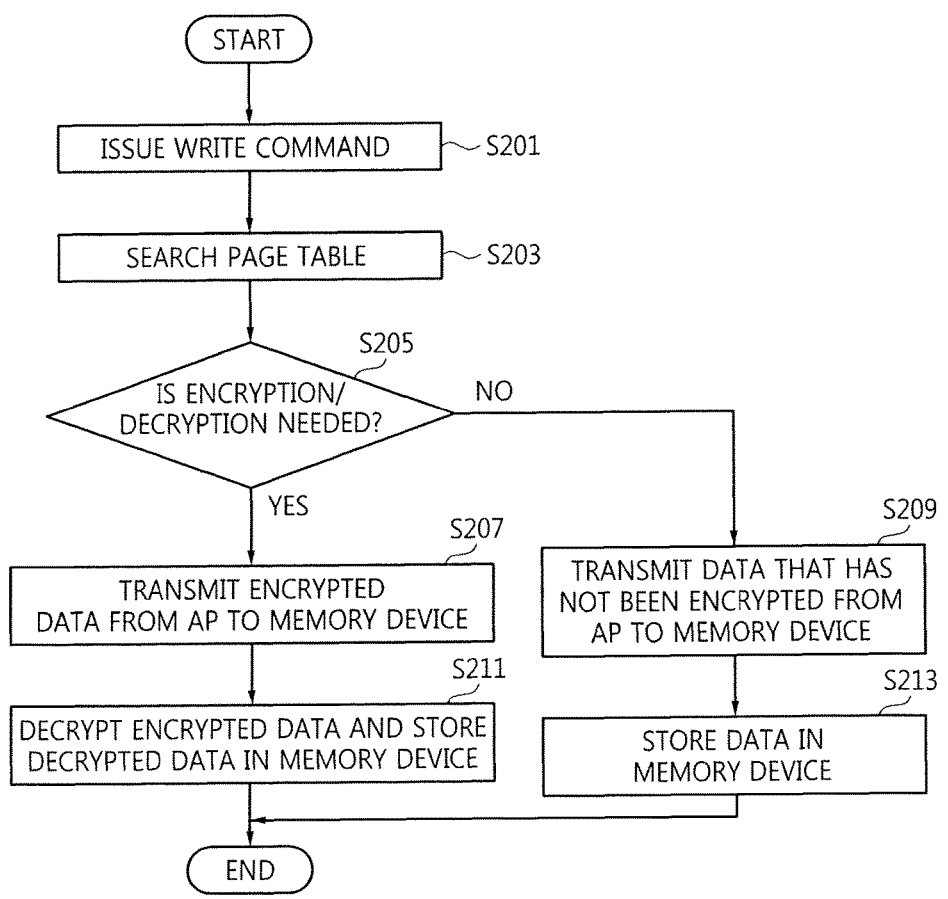
FIG. 14 is a flowchart illustrating a write operation of the data processing system illustrated in FIG. 13 according to an exemplary embodiment of the inventive concept.

FIG. 14 is a flowchart illustrating a write operation of the data processing system 10B illustrated in FIG. 13 according to an exemplary embodiment of the inventive concept. Referring to FIGS. 12 through 14, to perform a write operation, the CPU 102 in the AP 100B issues the write command CMDW in operation S201. The CPU 102 searches the page table 107 using a logical address related with the write command CMDW and determines a physical address corresponding to the logical address in operation S203.

Each time the write command CMDW is issued, a logical address may change, and therefore, a physical address corresponding to the logical address may also change. Each of the page entries ENTRY1 through ENTRYN maps a logical address to a physical address. Each of the page entries ENTRY1 through ENTRYN also stores a selection signal indicating whether to perform encryption and/or decryption.

For example, the selection signal CTRL1 stored in the first entry ENTRY1 selected by the write command CMDW may indicate whether to perform encryption and/or decryption. The CPU 102 may determine whether current data processed according to the write command CMDW needs encryption and/or decryption based on the selection signal CTRL1 in operation S205.

When the selection signal CTRL1 is at a first level (e.g., at a high level or has a data value of "1"), the first selection circuit 118 transmits the first encrypted data EDATA1 from the first encoder 115 to the memory device 200B through the channel 300. Thus, the AP 100B transmits the first encrypted data EDATA1 to the memory device 200B in operation S207. The third selection circuit 218 transmits the first decrypted data DATA2 from the second decoder 215 to the memory core 202 to be stored in operation S211.

When the selection signal CTRL1 is at a second level (e.g., is at a low level or has a data value of "0"), the first selection circuit 118 bypasses the first data DATA1 to the memory device 200B via the channel 300 in operation S209. That is, the AP 100B transmits the first data DATA1 that has not been encrypted to the memory device 200B in operation S209. The third selection circuit 218 transmits the first data DATA1 to the memory core 202 to be stored in operation S213.

A selection signal stored in the second entry ENTRY2 selected by a new write command may indicate whether to perform encryption and/or decryption. For example, the CPU 102 may determine whether current data processed according to the write command needs encryption and/or decryption based on the selection signal in operation S205.

Figure 15:
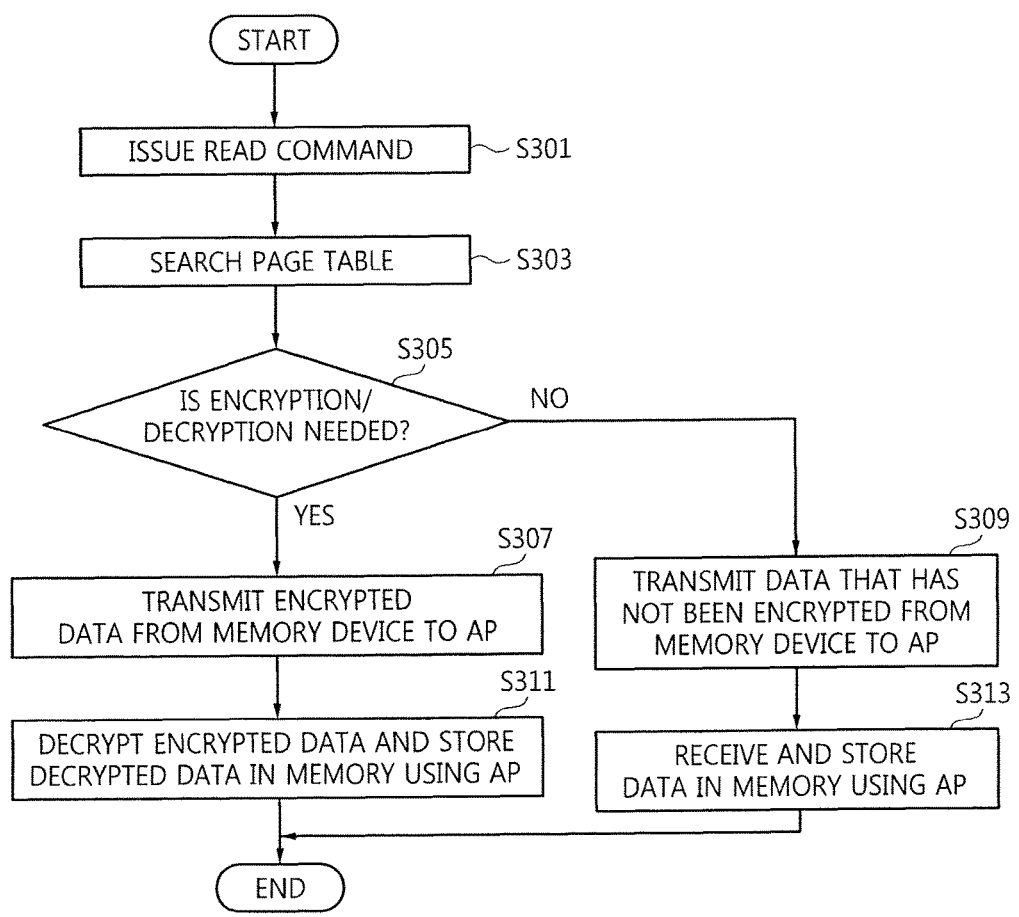
FIG. 15 is a flowchart illustrating a read operation of the data processing system illustrated in FIG. 13 according to an exemplary embodiment of the inventive concept.

FIG. 15 is a flowchart illustrating a read operation of the data processing system 10B illustrated in FIG. 13 according to an exemplary embodiment of the inventive concept. Referring to FIGS. 12, 13 and 15, to perform a read operation, the CPU 102 in the AP 100B issues the read command CMDR in operation S301. The CPU 102 searches the page table 107 using a logical address related with the read command CMDR and determines a physical address corresponding to the logical address in operation S303.

Each time the read command CMDR is issued, a logical address may change, and therefore, a physical address corresponding to the logical address may also change. Each of the page entries ENTRY1 through ENTRYN maps a logical address to a physical address. Each of the page entries ENTRY1 through ENTRYN also stores a selection signal indicating whether to perform encryption and/or decryption. For example, the selection signal CTRL1 stored in the first entry ENTRY1 selected by the read command CMDR may indicate whether to perform encryption and/or decryption. The CPU 102 may determine whether current data processed according to the read command CMDR needs encryption and/or decryption based on the selection signal CTRL1 in operation S305.

When the selection signal CTRL1 is at the first level, the fourth selection circuit 223 transmits the second encrypted data EDATA3 from the second encoder 220 to the AP 100B through the channel 300. Thus, the memory device 200B transmits the second encrypted data EDATA3 to the AP 100B in operation S307. The first decoder 120 decrypts the second encrypted data EDATA3 output from the encoder 220 and outputs the second decrypted data DATA4 to the second selection circuit 123, and the second selection circuit 123 outputs the second decrypted data DATA4 as output data in operation S311. The second decrypted data DATA4 may be stored in the memory 400 in operation S311.

When the selection signal CTRL1 is at the second level, the fourth selection circuit 223 bypasses the second data DATA3 to the AP 100B via the channel 300 in operation S309. For example, the memory device 200B transmits the second data DATA3 that has not been encrypted to the AP 100B in operation S309. The second selection circuit 123 may store the second data DATA3 in the memory 400 in operation S313.

A selection signal stored in the second entry ENTRY2 selected by a new read command may indicate whether to perform encryption and/or decryption. That is, the CPU 102 may determine whether current data processed according to the read command needs encryption and/or decryption based on the selection signal in operation S305.

As described above, according to exemplary embodiments of the inventive concept, a data processing system encrypts or decrypts data using a stream cipher, which may result in having less overhead and lower power consumption than conventional data processing systems using a block cipher. In addition, an AP and a memory device perform encryption and/or decryption of data and use a MAC for the data in the data processing system, thereby ensuring the integrity of data. Since the data processing system performs encryption and/or decryption using a stream cipher, delay of memory access between the AP and the memory device may be prevented or reduced, and the data processing speed of the AP may be increased.

While the inventive concept has been particularly shown and described with reference to the exemplary embodiments thereof, it will be understood by those of ordinary skill in the art that various changes in form and detail may be made therein without departing from the spirit and scope of the inventive concept as defined by the following claims.

What is claimed is:

1. A data processing system, comprising:
an application processor comprising a memory;
a memory device comprising a memory core; and
a channel connecting the application processor and the memory device,
wherein the application processor is configured to store first data as plaintext data in the memory, encrypt the plaintext data into first encrypted data using a first encryption key and a first initialization vector in response to a write command, and transmit the first encrypted data to the memory device through the channel,
the memory device is configured to decrypt the first encrypted data into first decrypted data using a second encryption key and a second initialization vector, and store the first decrypted data in the memory core, the first encryption key and the first initialization vector are stored in the application processor, the second encryption key and the second initialization vector are stored in the memory device, the first encryption key is identical to the second encryption key, and the first initialization vector is identical to the second initialization vector, and the application processor is configured to count a number of issues of the write command and determine whether to update the first initialization vector according to a count result obtained by counting the number of issues of the write command, wherein encrypting the plaintext data into the first encrypted data using the first encryption key and the first initialization vector protects the first encrypted data from an external physical attack while the first encrypted data is transmitted from the application processor to the memory device through the channel.

2. The data processing system of claim 1, wherein the application processor is configured to generate a first message authentication code (MAC) using a third encryption key, a third initialization vector, and the first data, and transmit the first MAC and the first encrypted data to the memory device through the channel.

3. The data processing system of claim 2, wherein the memory device is configured to generate a second MAC using a fourth encryption key, a fourth initialization vector, and the first decrypted data, compare the first MAC with the second MAC, detect an error in the first decrypted data according to a comparison result obtained by comparing the first MAC with the second MAC, and transmit a detection result obtained by detecting the error to the application processor through the channel, and the fourth encryption key and the fourth initialization vector are stored in the memory device, the third encryption key is identical to the fourth encryption key, and the third initialization vector is identical to the fourth initialization vector.

4. The data processing system of claim 1, wherein the application processor is configured to update the first initialization vector stored in a first memory region in the application processor based on the write command and transmit a first updated initialization vector to the memory device through the channel, and the memory device is configured to update the second initialization vector stored in a second memory region in the memory device using the first updated initialization vector.

5. The data processing system of claim 1, wherein the memory device is configured to encrypt second data stored in the memory core using the second encryption key and the second initialization vector in response to a read command, and transmit second encrypted data to the application processor through the channel, and the application processor is configured to decrypt the second encrypted data using the first encryption key and the first initialization vector to generate second decrypted data.

6. The data processing system of claim 5, wherein the memory device is configured to generate a third message authentication code (MAC) using a third encryption key, a third initialization vector, and the second data, and transmit the third MAC and the second encrypted data to the application processor through the channel.

7. The data processing system of claim 6, wherein
the application processor is configured to generate a fourth MAC using a fourth encryption key, a fourth initialization vector, and the second decrypted data, compare the third MAC with the fourth MAC, and detect an error in the second decrypted data according to a comparison result obtained by comparing the third MAC with the fourth MAC, and
the fourth encryption key and the fourth initialization vector are stored in the application processor, the third encryption key is identical to the fourth encryption key, and the third initialization vector is identical to the fourth initialization vector.

8. The data processing system of claim 5, wherein
the application processor is configured to update the first initialization vector stored in a first memory region in the application processor based on the read command, and transmit a first updated initialization vector to the memory device through the channel, and
the memory device is configured to update the second initialization vector stored in a second memory region in the memory device using the first updated initialization vector.

9. The data processing system of claim 1, wherein the application processor is configured to count a number of issues of a read command and determine whether to update the first initialization vector according to a count result obtained by counting the number of issues of the read command.

10. An application processor, comprising:
a first memory configured to store a first encryption key;
a second memory configured to store a first initialization vector;
a third memory configured to store first data as plaintext data;
an encoder configured to encrypt the plaintext data into first encrypted data using the first encryption key and the first initialization vector, and to transmit the first encrypted data to a memory device through a channel;
a decoder configured to decrypt second encrypted data received from the memory device using the first encryption key and the first initialization vector to generate second decrypted data; and
a counter configured to count a number of issues of at least one of a write command and a read command, and to control updating of the first initialization vector according to a count result obtained by counting the number of issues of the at least one of the write command and the read command,
wherein the write command and the read command are issued by a central processing unit (CPU),
wherein encrypting the plaintext data into the first encrypted data using the first encryption key and the first initialization vector protects the first encrypted data from an external physical attack while the first encrypted data is transmitted from the encoder to the memory device through the channel.

11. The application processor of claim 10, further comprising:
a fourth memory configured to store a second encryption key;
a fifth memory configured to store a second initialization vector;
a first message authentication code (MAC) generator configured to generate a first MAC using the first data, the second encryption key, and the second initialization vector to transmit the first MAC and the first encrypted data to the memory device through the channel, and to generate a second MAC using the second decrypted data, the second encryption key, and the second initialization vector; and
an error detector configured to compare the second MAC with a third MAC received from the memory device, and to detect an error in the second decrypted data according to a comparison result obtained by comparing the second MAC with the third MAC.

12. The application processor of claim 10, wherein the first initialization vector is updated according to a command related to the first encrypted data, and a first updated initialization vector is transmitted to the memory device through the channel.

13. The application processor of claim 11, wherein the second initialization vector is updated according to a command related to the first encrypted data, and a second updated initialization vector is transmitted to the memory device through the channel.

14. A method of processing data, comprising:
storing first data as plaintext data in a memory disposed in an application processor;
encrypting, by the application processor, the plaintext data into first encrypted data using a first encryption key and a first initialization vector in response to a write command;
transmitting the first encrypted data from the application processor to a memory device through a channel, wherein the application processor is connected to the memory device via the channel;
decrypting, by the memory device, the first encrypted data into first decrypted data using a second encryption key and a second initialization vector;
storing the first decrypted data in a memory core of the memory device,
wherein the first encryption key and the first initialization vector are stored in the application processor, the second encryption key and the second initialization vector are stored in the memory device, the first encryption key is identical to the second encryption key, and the first initialization vector is identical to the second initialization vector;
counting, by the application processor, a number of issues of the write command; and
determining, by the application processor, whether to update the first initialization vector according to a count result obtained by counting the number of issues of the write command,
wherein encrypting the plaintext data into the first encrypted data using the first encryption key and the first initialization vector protects the first encrypted data from an external physical attack while the first encrypted data is transmitted from the application processor to the memory device through the channel.

15. The method of claim 14, further comprising:
generating, by the application processor, a first message authentication code (MAC) using a third encryption key, a third initialization vector, and the first data; and
transmitting the first MAC and the first encrypted data from the application processor to the memory device through the channel.

16. The method of claim 15, further comprising:
generating, by the memory device, a second MAC using a fourth encryption key, a fourth initialization vector, and the first decrypted data;
comparing, by the memory device, the first MAC with the second MAC;

detecting, by the memory device, an error in the first decrypted data according to a comparison result obtained by comparing the first MAC with the second MAC; and transmitting a detection result obtained by detecting the error from the memory device to the application processor through the channel, wherein the fourth encryption key and the fourth initialization vector are stored in the memory device, the third encryption key is identical to the fourth encryption key, and the third initialization vector is identical to the fourth initialization vector.

17. The method of claim 14, further comprising:

updating, by the application processor, the first initialization vector stored in a first memory region in the application processor based on the write command;

transmitting a first updated initialization vector from the application processor to the memory device through the channel; and updating, by the memory device, the second initialization vector stored in a second memory region in the memory device using the first updated initialization vector.

* * * * *